United States Patent [19]

Wang et al.

[11] Patent Number: 5,985,460
[45] Date of Patent: *Nov. 16, 1999

[54] INSULATOR COMPOSITION, GREEN TAPE, AND METHOD FOR FORMING PLASMA DISPLAY APPARATUS BARRIER-RIB

[75] Inventors: Carl Baasun Wang; John James Felten, both of Chapel Hill, N.C.; Hiroshi Kanda, Kanagawa; Motohiko Tsuchiya, Tokyo, both of Japan

[73] Assignee: E. I. du Pont de Nemours and Company, Wilmington, Del.

[*] Notice: This patent is subject to a terminal disclaimer.

[21] Appl. No.: 08/802,364

[22] Filed: Feb. 20, 1997

Related U.S. Application Data

[62] Division of application No. 08/542,273, Oct. 12, 1995, Pat. No. 5,674,634.

[30] Foreign Application Priority Data

Dec. 5, 1994 [JP] Japan ................................. 6-300906

[51] Int. Cl.⁶ .................................................. B32B 17/06
[52] U.S. Cl. ........................... 428/426; 428/702; 501/32; 501/21; 501/76
[58] Field of Search ................... 501/32, 21, 76; 428/426, 702

[56] References Cited

U.S. PATENT DOCUMENTS

| | | | |
|---|---|---|---|
| 3,485,648 | 12/1969 | Bishop | 501/76 |
| 3,950,174 | 4/1976 | Suzuki et al. | 501/76 |
| 3,951,669 | 4/1976 | Malmendier | 501/76 |
| 4,099,977 | 7/1978 | Francel et al. | 501/76 |
| 4,115,132 | 9/1978 | Suzuki et al. | 501/76 |
| 4,131,478 | 12/1978 | Davis et al. | 501/76 |
| 4,310,357 | 1/1982 | Matsuura et al. | 501/76 |
| 4,365,021 | 12/1982 | Pirooz | 501/32 |
| 4,405,722 | 9/1983 | Kokubu et al. | 501/76 |
| 4,537,863 | 8/1985 | Matsuura et al. | 501/76 |
| 5,068,210 | 11/1991 | DiLazzaro et al. | 501/32 |
| 5,070,046 | 12/1991 | Hu | 501/9 |
| 5,145,803 | 9/1992 | Daimer et al. | 501/32 |
| 5,179,047 | 1/1993 | Chiba | 501/32 |
| 5,216,207 | 6/1993 | Prabhu | 501/21 |
| 5,316,985 | 5/1994 | Jean | 501/16 |
| 5,489,319 | 2/1996 | Tokuda | 55/213 |
| 5,557,074 | 9/1996 | Miyamoto | 174/151 |
| 5,643,840 | 7/1997 | Hikata et al. | 501/76 |

FOREIGN PATENT DOCUMENTS 0 613 166  8/1994  European Pat. Off. .

OTHER PUBLICATIONS

Uchiike, H., "Researchers Work to Endow Color PDP With HD–TV Capabilities", JEE Journal of Electronic Engineering, vol. 30, No. 323, Nov. 1993, pp. 70–75.

Patent Abstracts of Japan, vol. 007, No. 267, Nov. 29,1983.

Patent Abstracts of Japan, vol. 017, No. 044, Jan. 27, 1993.

*Primary Examiner*—Deborah Jones
*Assistant Examiner*—Cathy Lam

[57] ABSTRACT

A coatable insulator composition for use in the formation of a green tape comprising fine inorganic micropowders composed of amorphous glass and a refractory oxide in a volatile organic solvent solution of a binder composed of a polymer substance and a plasticizer(s). A green tape obtained by coating said composition over a flexible substrate, and heating and drying this product to remove the organic solvent; and a method for forming a barrier-rib for a plasma display apparatus by sandblast etching using said green tape as an insulator layer for the barrier-rib formation. A use of a pre-formed green tape of uniform thickness in the formation of the barrier-rib of a plasma display apparatus allows the thickness uniformity of the barrier-rib to be improved and the work rationalized, which means that the plasma display apparatus can be made larger and finer, and mass production throughput will be enhanced.

4 Claims, 4 Drawing Sheets

101 / 102    FORMATION OF ANODE

103    LAMINATION OF GREEN TAPE FOLLOWED BY HEAT TREATMENT

104    LAMINATION OF SANDBLASTING RESIST LAYER

105    PATTERNING OF SANDBLASTING RESIST LAYER

SANDBLASTING

STRIPPING OF SANDBLASTING RESIST LAYER

106    FIRING

FORMATION OF ANODE

LAMINATION OF GREEN TAPE FOLLOWED BY HEAT TREATMENT

SANDBLASTING MASK PATTERN

SANDBLASTING

FIRING

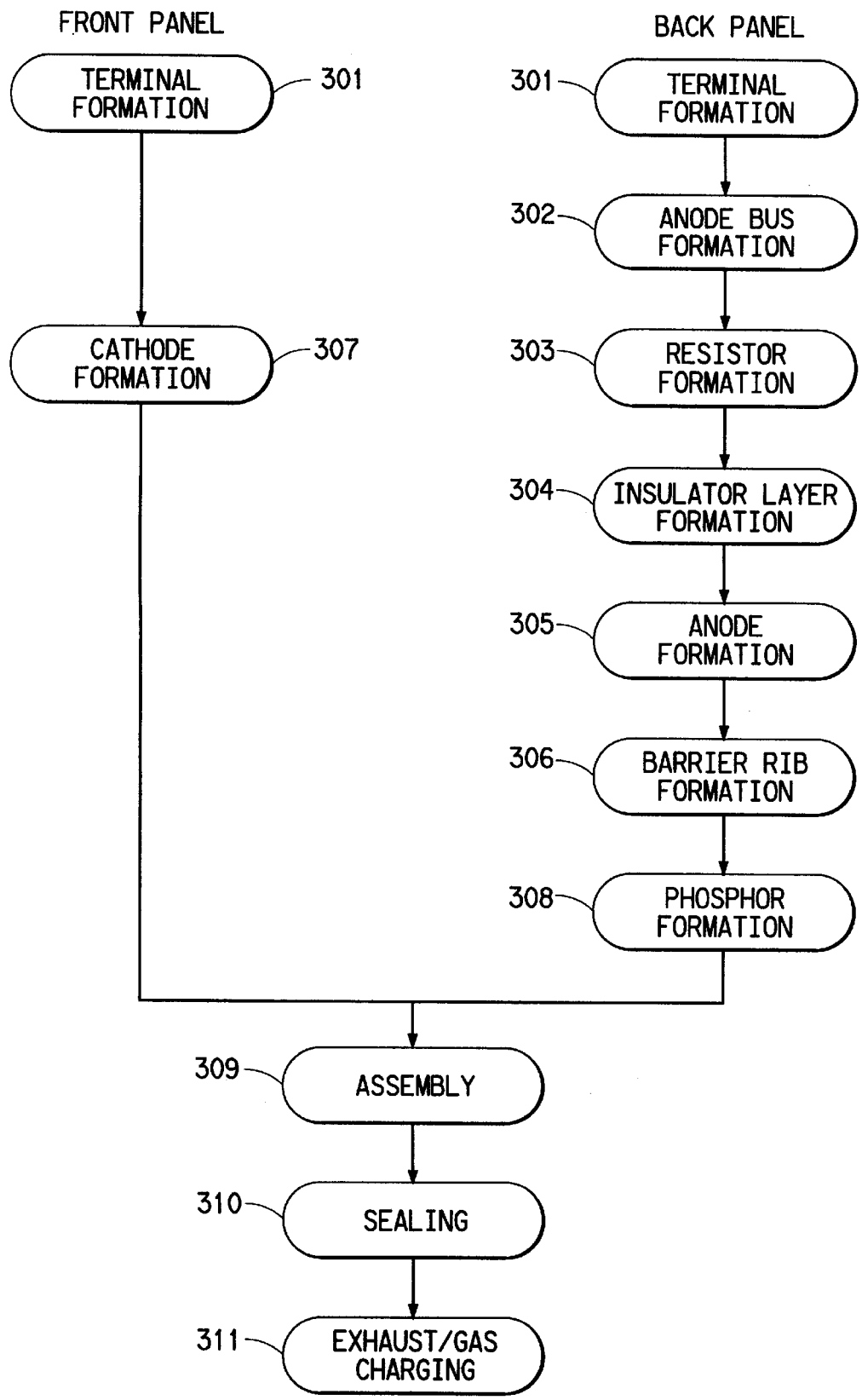

INSULATOR COMPOSITION, GREEN TAPE, AND METHOD FOR FORMING PLASMA DISPLAY APPARATUS BARRIER-RIB

This a division of application Ser. No. 08/542,273, filed Oct. 12, 1995, now U.S. Pat. No. 5,674,634.

FIELD OF THE INVENTION

The present invention relates to a method for forming a plasma display apparatus (hereinafter referred to as "PDP apparatus", and a coatable insulator composition for use in the formation of a green tape for barrier rib formation of the PDP apparatus.

BACKGROUND OF THE INVENTION

Much progress has been made in the development of PDP apparatus that serve as flat panel displays in large, wall-mount television and high-definition television displays which are used in place of conventional CRTs. In the direct current (DC) PDP apparatus of FIG. 5, a pair of glass substrates (501 and 502) having a plurality of anodes (503) and cathodes (504) positioned perpendicular, the anodes are covered with an insulator layer (505) as needed on the inner surface of the substrate (502) and the anodes (503) and cathodes (504) are positioned facing each other to maintain a specific gas discharge distance, the cell (508) is then coated with a phosphor material (506) chosen from blue, green and red and the edges thereof are sealed airtight with a sealing material, after which the above-mentioned gas discharge area is filled with a specific discharge gas (509) to create a gas discharge section. A structure is employed whereby the above-mentioned gas discharge distance is kept identical and discharge occurs in a specific cell partitioned by an insulator barrier-rib (507).

PDP apparatus are being made larger and more precise and converted to color. Therefore, a need for a more uniform barrier-rib height, i.e., electrode spacing is required. At the same time, there is a need for cost effective manufacturing of the apparatus.

Screen printing is the most commonly used method for forming the barrier-ribs used in a PDP apparatus. As discussed in published Japanese Patent Application 58-150248, screen printing involves a step in which an insulator powder such as glass is made into a printable paste, after which lines or dots and spaces are paired and printed in layers to a specific thickness at a resolution of about 3 pairs per millimeter, for example, using a screen printing mesh mask (in the case of a small display). At least three or four layers, and at most about fifteen layers, are built up through repeated printing to a specific thickness (height) while the above-mentioned resolution is maintained. This multiple printing step therefore requires an accuracy check of position at each stage of the printing, care must be taken to avoid oozing of the paste at each stage. Furthermore, the film thickness must be precisely controlled so that the final height of the layers is uniform, all of which makes this an extremely complicated step with a low yield. An experienced printing technician has to spend a great deal of time and effort to get around the drawbacks to this step, which incurs tremendous costs.

In light of this situation, a sandblasting barrier-rib formation method has been developed and put into practical use in recent years. The method will be described while referring to FIG. 4. The first step is to form an anode (402) on a glass substrate (401). The insulator layer (406) that serves as the barrier-rib is then screen-printed to the desired thickness. A photoresist (403) that is resistant to sandblasting is bonded over the dried insulator layer and patterned, an abrasive material (404) is sprayed by a sandblasting machine (405). To remove the insulator material from the region in which the resist has not been patterned (407) and the resist is then stripped away and the remaining product fired, which forms a fine barrier-rib of a uniform height.

The above-mentioned screen printing method, in which an insulator layer in the desired pattern is printed to the desired height using a paste whose principal component is an insulator powder such as glass.

Although positioning is easy with a sandblasting method because it involves solid unpatterned printing, the printing still has to be repeated a number of times, and achieving a uniform film thickness is still difficult. Furthermore, because of the need for the barrier-rib of a PDP apparatus to be reliable, this method requires careful paste preparation and printing work so as to avoid any defects in the process, and the work environment and atmosphere also must be carefully managed and improvement in work or production efficiency remains a problem in the industry.

The inventors perfected the present invention upon discovering that a reliable barrier-rib with an uniform height or thickness can be formed easily and the barrier-rib formation step can be greatly improved upon by using a pre-formed green tape of an uniform thickness for the insulator layer.

SUMMARY OF THE INVENTION

The present invention relates to a coatable insulator composition for use in the formation of a green tape used in the formation of a barrier-rib for a plasma display apparatus comprising a) an inorganic fine powder composed of 30 to 60 vol % non-crystallizable glass whose softening point is at least 50° C. lower than the firing temperature, 20 to 70 vol % refractory oxide, and 0–50 vol % refractory pigment b) a binder composed of 40 to 60 vol % polymer and 40 to 60 vol % plasticizer, and c) a volatile organic solvent, whereby the inorganic fine powder is dispersed in a solution obtained by dissolving the binder in the volatile organic solvent.

The above glass may be comprised of a first and second glass wherein the inorganic fine powder is composed of 1 to 30 vol % of a first glass, 30 to 60 vol % of a second glass, 20 to 70 vol % refractory oxide, and 0 to 50 vol % refractory pigment; wherein the first glass has a softening point at least 50° C. lower than that of the second glass wherein the softening point of the second glass is at least 50° C. lower than the firing temperature.

The present invention also relates to a green tape used in the formation of a barrier-rib for a plasma display apparatus, comprising the above-mentioned coatable insulator composition coated over a flexible substrate, wherein the volatile organic solvent is removed by heating.

The present invention further relates to a method for forming a plasma display apparatus whose edges are sealed with a sealing material and is equipped with (i) a pair of substrates a distance equally apart and positioned facing each other wherein a plurality of electrodes that make up a discharge light emitting display are provided to the surface of at least one of the substrates, and (ii) a barrier-rib that divides said discharge light emitting display, wherein the plasma display barrier-rib is formed by the steps comprising a) at least one layer of the above-mentioned flexible green tape devoid the flexible substrate is laminated over the surface of an assembly on which an electrode pattern layer of a conductor composition has been formed on a glass substrate, and is heated within the range of 300° C. to 400° C. to form an insulator layer in which the organic matter in the layer has been partially removed, b) a non-ceramic photoresist layer for use in sandblasting is formed on the insulator layer obtained in step a), and a resist pattern corresponding to the barrier-rib is formed in the region that will not be etched by sandblasting, c) a barrier-rib structure component is formed by sandblasting away the insulator layer in the region with no resist pattern formed in step b), and d) the formed barrier-rib structure patterned in step c) is fired after stripping the resist layer.

In a glass system wherein a first glass and a second glass is used, the green tape is heated within the range of 350° C. to 450° C. which causes complete organic removal.

The present invention still further relates to a method for forming a plasma display barrier-rib comprising a) the above mentioned flexible green tape devoid the flexible substrate laminated over the surface of an assembly on which an electrode pattern layer of a conductor composition has been formed on a glass substrate, and is heated within the range of 300° C. to 400° C. to form an insulator layer in which some of the organic matter in the layer has been removed, b) a ceramic containing resist paste or green tape layer is formed on the insulator layer obtained in step a), and a mask pattern for use in sandblasting and corresponding to the barrier-rib is formed in the region that will not be etched by sandblasting, c) a barrier-rib structure formed by sandblasting away the insulator layer in the region with no resist pattern formed in step b), and d) the barrier-rib formed by the insulator layer patterned in step c) is fired.

BRIEF DESCRIPTION OF THE DRAWINGS

FIG. 3 is a schematic representing the assembly of a PDP apparatus.

DETAILED DESCRIPTION OF THE INVENTION

Figure 1A:
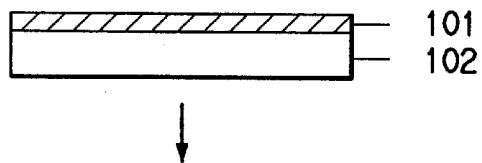
FIG. 1 is a schematic representing a barrier-rib formation utilizing a sandblasting resist that is photoimageable wherein the resist is stripped.

The insulator composition (green tape) of the present invention is a coatable composition obtained by dispersing an inorganic powder composed of a non-crystalline glass and a refractory oxide in a solution obtained by dissolving a binder composed of polymer(s) and plasticizer(s) in a volatile organic solvent. Coatable herein means a composition which possesses a rheology of a reasonable viscosity of about 1 to 25 pascal seconds wherein the composition is applied to a substrate. For the purpose of producing an extremely clean and defect free green tape, it is preferable to laminate a flexible substrate as a cover sheet to the dried green tape before it is wound. Depending on the adhesion differential between the green tape to base film and the green tape to cover sheet, it is possible to peel off the base film first and laminate the base film side of the green tape to a substrate of choice. Alternatively, it is equally possible to peel off the cover sheet and laminate the cover sheet side of the green tape to a substrate of choice. Various chemical or physical treatments of flexible substrate such as silicon coating or electrical discharge or plasma discharge have been applied to generate the adhesion differential.

Many green tapes utilize ceramic dielectric filler. The advantages include lower defect counts than in screen printed thick film dielectrics, thicker coatings than can be screen printed, and the ability to inspect films before they are laminated.

A typical green tape must be stripped from its backing during processing, which subjects the tape to forces that can distort the tape. The fragile tape must be accurately registered before lamination. Also, current uniaxial press laminators tend to be expensive and time consuming, when it is compared to heated roll laminator.

Several findings about composition and lamination of sand blastable tapes have been made:

i) The composition can be quite different from standard green tape, because the sand blastable tape-on-substrate (S/B TOS) never needs to support itself. It is always either supported on Mylar backing, Mylar cover sheet, or on a glass substrate.

ii) Lesser strength is needed, a softer, more pliable tape is preferred. One that can yield and flow under pressure. This provides tape conformation to the irregular topography of the substrate and reduces the height of bumps produced by buried lines and other raised features. This property is highly desirable in fabricating a barrier-rib structure for plasma display panels.

iii) The compositions have a yield point because of the high solids level. This means that they will not flow until they are subjected to pressure and heat in excess of their yield point, so that they are less prone to creep when kept in a roll. Standard tapes such as commonly used photoresists are not highly filled and are more subjected to creep.

In the tape composition of the present invention, the tapes are formulated so that they can be laminated to the substrate by using a heated and pressurized roll. These compositions require a higher level of organic content than compositions that are uniaxial press laminated as known in the art. The usual approach to formulation of tapes is to use the maximum practical amount of plasticizer to minimize the amount of matter that must be burned out in the furnace. Plasticizers can generally be volatilized before burnout, without pyrolysis of the plasticizer. In the present invention, tapes without ceramic filler need to be stripped before final firing. The usual tape composition is 30–70 volt % binder and 35–65 volt % inorganic.

The components of this composition will be described in detail hereinbelow.

AMORPHOUS AND NON-CRYSTALLINE GLASS

One important criteria of the glass of the insulator composition is that it is amorphous and non-crystalline under the usage conditions of (1) a softening point of at least 50° C. below the firing temperature, and (2) a viscosity of $1 \times 10^5$ poise or less at the sintering temperature. When the glass that combines the above physical properties is fired at 450° C. to 600° C., extremely good and complete combustion of the organic matter is possible, and the proper amount of fluidity at the peak firing temperature also allows both the compactness required of a discharge barrier-rib and the strength required of a structural material to be achieved. The correlation between these two variables is required for the definition of the viscosity-temperature characteristics of the glass that can be used in the present invention. The term "softening point" used herein refers to the softening point measured by dilatometer.

It was found that the glass should have no serious effect on the dissolution of the refractory oxide of the composition, or, if it solubilizes the refractory oxide to an extreme degree, the resulting solution must have a suitably high viscosity at the firing temperature, both at the initial firing stage and in the whole course of firing. However, the refractory oxide and pigment must not be dissolved in the glass in an amount over 20 wt. %, and preferably not over 10 wt. %.

Similarly, the amount of glass with respect to the refractory oxide and pigment is extremely important. If glass having a density of 2 to 5 $g/cm^3$ is used, the amount of glass is 30 to 60 vol %, and preferably 40 to 50 vol %, and the remainder is refractory oxide and pigment. As to the exact amount of glass, more glass is required when the viscosity of the glass at the firing temperature is relatively high, and less glass is needed when the viscosity of the glass is relatively low. If the amount of glass is too small, the desired degree of densification of the layer will not be attained during firing, and if it is too large, the layer will become too soft at the firing temperature, so the shape of the barrier-rib will change and the desired electrode spacing and cell shape will not be preserved, and the glass will also ooze out into the conductor layer adjacent to the glass layer, creating problems of potential shorts and opens in the conductive circuits. Moreover, this flow of glass makes junction with the adjacent conductor exceedingly difficult. Too much glass leads to entrapment of organic matter, which can cause blisters in the insulator layer during the subsequent firing. On the other hand, if the amount of glass is less than 30 vol %, the fired tape will be too porous and not sufficiently compact. When these changes are considered, the fired tape should contain amorphous and non-crystalline glass in an amount of 40 to 50 vol %.

An alternative glass system with 2 or more frits may be utilized in the invention wherein the first glass (type I) has a softening point at least 50° C., and preferably 100° C. lower than that of the second glass (type II) wherein the softening point of the second glass is at least 50° C., and preferably 100° C. lower than that of the firing temperature. Both types of glass exhibit a viscosity of $1 \times 10^5$ poise or less at the firing temperature. The benefit of having type I glass is to provide the mechanical integrity of the insulator layer after a thermal treatment between 350° C. and 470° C. to completely remove the organic substance. Detailed processing information is described in a later session about the barrier-rib formation method.

REFRACTORY OXIDE & PIGMENT

The refractory oxide and pigment used in the present invention, regardless of the type of glass with which it is used, is one that is insoluble in glass or, if soluble, has as little solubility as possible. When the assembly comprises multiple layers, it is important in terms of forming this multilayer system that the insulator layer have expansion characteristics equivalent to those of the substrate so as to achieve dimensional stability, especially with respect to substrate warping. Within this criterion, the refractory oxide and pigment are selected such that the thermal coefficient of expansion (TCE) of the mixture with glass will be close to the TCE of the substrate being used. Specifically, when the glass has a lower TCE than the refractory oxide with which it is used, such as $Al_2O_3$, a filler with a high TCE, such as $\alpha$-quartz or $CaZrO_3$, is used along with the refractory oxide. Meanwhile, when glass with a high TCE is used, a filler with a low TCE, such as fused silica, cordierite, or mullite, should be used along with the refractory oxide.

In order to make the fired insulator layer even more compact, it is important that the mixture of glass and refractory oxide have an extremely small particle diameter. In particular, independent particles should not exceed 15 $\mu$m, with 10 $\mu$m or less being preferable. It is preferable for essentially all of the inorganic solid particles to be between 0.2 and 5 $\mu$m.

Depending on the color requirement of the barrier-rib structure, various refractory pigments may be used. For example, a thin top layer of black color has been used to enhance color contrast. For that purpose, chromium oxides with various dopants such as cobalt, copper, iron, nickel, tin, manganese, or zinc, or cobalt oxide with iron or manganese may be used to generate black color that remains after firing.

POLYMER SUBSTANCE

The above-mentioned inorganic powder of glass and refractory oxide are dispersed in a medium obtained by dissolving in a volatile organic solvent a binder composed of polymer(s), plasticizer(s), and an optional dissolution substance such as a parting agent, a dispersant, a peeling agent, an antifouling agent, a wetting agent, etc.

A wide range of polymer substances that have been used in conventional methods for manufacturing a green tape, which involves firing at a temperature high enough that the binder can be easily burned away in the air, can be used as the main component of the binder. Examples of this polymer substance include poly(vinylbutyral), poly(vinyl acetate), poly(vinyl alcohol), methyl cellulose, ethyl cellulose, hydroxyethyl cellulose, methyl hydroxyethyl cellulose, and other cellulose-based polymers, atactic polypropylene, polyethylene, poly(methylsiloxane), poly(alkylene carbonate) poly(methylphenylsiloxane), and other silicon-based polymers, polystyrene, butadiene/styrene copolymers, poly(vinylpyrrolidone), polyamide, high molecular weight polyether, a copolymer of ethylene oxide and propylene oxide, polyacrylamide, sodium polyacrylate, poly(lower alkyl acrylate), copolymers and multipolymers of various combinations of lower alkyl acrylates and methacrylates, and various other acrylic polymers. Copolymers of ethyl methacrylate and methyl acrylate, and terpolymers of ethyl methacrylate, methyl acrylate, and methacrylic acid have been used in the past as binders for slip molding substances.

It is also possible to use organic binders for use in a green tape composed of a miscible multipolymer mixture(s) of 0 to 100 wt % of a $C_1$ to $C_8$ alkyl methacrylate, 0 to 100 wt % of a $C_1$ to $C_8$ alkyl acrylate, and 0 to 5 wt % of an ethylene-based unsaturated carboxylic acid or amine.

It is preferable to use a polymer of a monofunctional methacrylate expressed by the following structural formula (Chemical Formula 1) or a poly($\alpha$-methylstyrene) that will burnout extremely cleanly and not leave any carbonaceous residue in the insulator layer even at a low firing temperature of 400 to 650° C. in an oxidizing atmosphere.

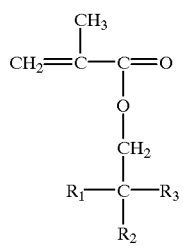

{Chemical Formula 1}

In the above-mentioned methacrylic monomer, the α-carbon must have two or three hydrogen atom substituents, depending on whether a β-carbon is present. If there is no β-carbon, this is replaced by hydrogen atoms, as in methyl methacrylate. If there is a β-carbon, $R_1$, $R_2$, and $R_3$ should be independently selected from among alkyl, aryl, aralkyl groups, or, if one of the three R groups is a hydrogen atom, the other two should be selected from among alkyl, aryl, aralkyl groups.

These two types of polymer should be homopolymers, or, in the case of a methacrylate polymer, should be a polymer that has only monomers suitable to the above criteria.

These two types of polymers may contain additional types of comonomer in an amount of less than or equal to 15 wt. %, but preferably 5 wt. % or less. This addition provides improved non-oxidative combustion characteristics. Examples of the additional monomers include ethylenic unsaturated carboxylic acids and amines, acrylates, styrene, acrylonitrile, vinyl acetate, and acrylamide. Similarly, other polymers that do not meet the above criteria, such as homopolymers and copolymers of these other monomers, can also be used instead of the comonomers in an amount less than or equal to 15 wt %. Regardless of whether these additions make up a separate polymer or are contained in the polymer chain of the principal component, it is permissible for them to be contained in the total polymer substance to the extent that they do not exceed approximately 15 wt. %, and preferably 5 wt %, of the total weight of the monomers present in the system.

Whichever polymer substance is used, its intrinsic viscosity measured at 20° C. in methylene chloride at a concentration of 0.25 g polymer in 50 ml of methylene chloride should be at least 0.1 poise so that it will have adequate bonding strength. There are no particular restrictions on the upper limit to the molecular weight, but the use of a polymer that has an intrinsic viscosity of 1.0 poise or less is preferable in terms of avoiding problems with solubility, and the use of a polymer that has an intrinsic viscosity of 0.3 to 0.6 poise produces particularly good results in the present invention.

PLASTICIZER

At least one type of plasticizer that will contribute to lowering the glass transition point (Tg) of the polymer substance is used. The plasticizer helps to ensure the lamination of the composition to the substrate. It is preferred that the boiling points of the plasticizers be close to 300° C. in order that they remain in the layer as the volatile solvent is driven off by heating. Nevertheless, it is further preferred that the volatility of the plasticizers be such that they can be removed from the system by simple heating if it is desired to reduce the amount of plasticizer.

With acrylic binder, for example, plasticizers can include dibutyl phthalate and other esters of aromatic acids; esters of aliphatic polyacids such as diisooctyl adipate, and nitrate esters; aromatic or aliphatic acid esters of glycol; polyoxyalkylene glycols, aliphatic polyols; alkyl and aryl phosphates; chlorinated paraffins; and sulfonamide types can be used.

In general, water insoluble plasticizers are advantageous for greater high humidity storage stability and environmental operating latitude, but not required. Suitable plasticizers include: glycol, triethylene glycol diacetate, triethylene glycol diproprionate, triethylene glycol dicaprylate, triethylene glycol dimethyl ether, triethylene glycol bis(2-ethylhexanoate), tetraethylene glycol diheptanoate, poly(ethylene glycol), poly(ethylene glycol)methyl ether, isopropyl naphthalene, diisopropyl naphthalene, poly(propylene glycol), glyceryl tributyrate, diethyl adipate, diethyl sebacate, dibutyl suberate, tributyl phosphate, tris(2-ethylhexyl)phosphate, t-butylphenyl diphenyl phosphate, triacetin, dioctyl phthalate, tris(2-butoxyethyl)phosphate and phosphates such as dicyclohexyl phthalate, dioctyl phthalate, diphenyl phthalate, diundecyl phthalate, butyl benzyl phthalate, 2-ethylhexyl benzyl phthalate.

The use of a plasticizer that will cleanly volatilize along with a high molecular weight polymer and leave essentially no residue behind is particularly favorable. An example of such a plasticizer is benzylbutyl phthalate. The use of this compound allows the plasticity of the binder to be adjusted, the resulting green tape will be suited for lamination on the substrate with the conductor lines, and the green tape will not be too soft or too weak for handling.

The total amount of the binder, including the plasticizer contained therein, must be sufficient to obtain good lamination and high green tape strength, but must not significantly reduce the filling amount of the inorganic solid powder. If too much inorganic matter is contained in the green tape, sintering and compacting during firing will be inadequate. For this reason, the binder should account for 30 to 50 vol %, and preferably 40 to 50 vol %, of the volume of the green tape, not including the solvent. The level of plasticizer can also be modified to enhance the green tape adhesion to the cover sheet to prevent coating defects such as wrinkles, air pockets and premature delamination of cover sheet from the green tape.

ORGANIC SOLVENT

An organic solvent is selected that will completely dissolve the polymer(s), plasticizer(s), and any additives that are added, and that have a high enough volatility to be evaporated readily by relatively low-level heating at atmospheric pressure. This solvent must also have a boiling point that is lower than any of the other additives contained in the composition. Examples of such solvents include acetone, xylene, methanol, ethanol, isopropanol, methyl ethyl ketone, 1,1,1-trichloroethane, tetrachloroethylene, amyl acetate, 2,2,4-triethylpentanediol-1,3-monoisobutyrate, toluene, methylene chloride, and fluorocarbons. The individual components of the solvent need not be perfect solvents of the polymer substance, as long as they function as a solvent when mixed with the other solvent components.

The green tape of the present invention is a tape of the previously mentioned insulator composition, such insulator composition that has been coated onto a flexible substrate, such as a copper belt or a polymer film, to form a layer having a uniform thickness, and wherein the volatile organic solvent has been volatilized and removed from said layer by heating. The heating temperature is a temperature below the boiling point or decomposition point of the binder component. Too high of a temperature is undesirable because it causes blistering.

The barrier-rib formation method of the present invention is based on sandblasting, and is characterized by the use of the above-mentioned green tape of the present invention.

Figure 1B:
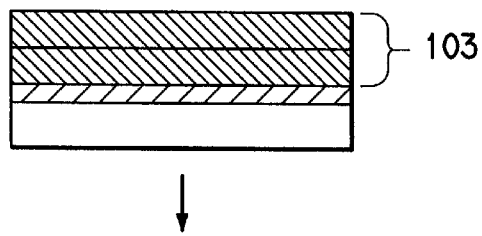
Figure 1C:
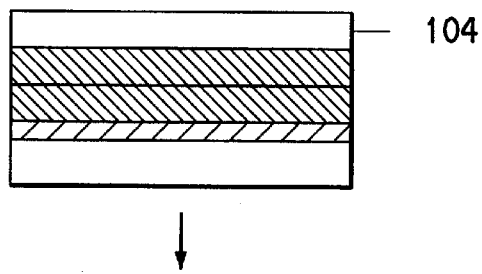
Figure 1D:
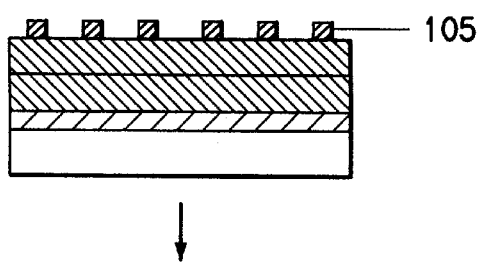
Figure 1E:
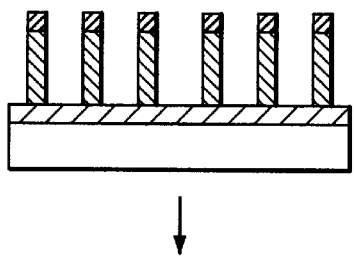
Figure 1F:
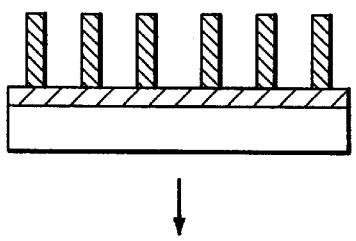
Figure 1G:
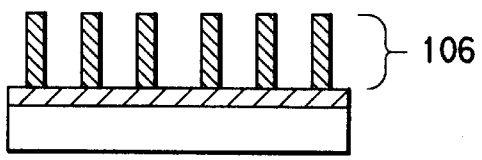
Figure 2A:
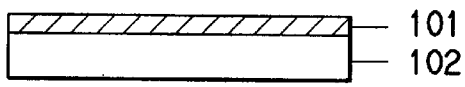
FIG. 2 is a schematic representing a barrier-rib formation utilizing a sandblasting resist that is photoimageable wherein the resist must not be stripped.
Figure 2B:
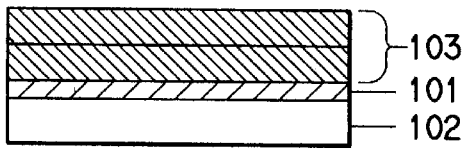
Figure 2C:
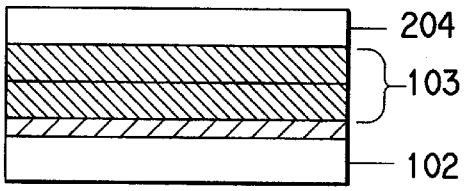
Figure 2D:
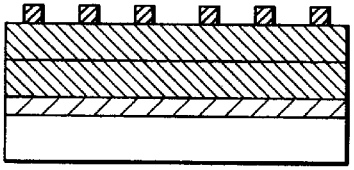
Figure 2E:
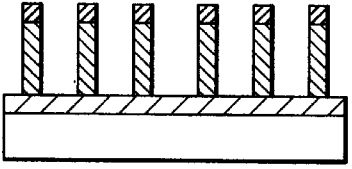
Figure 2F:
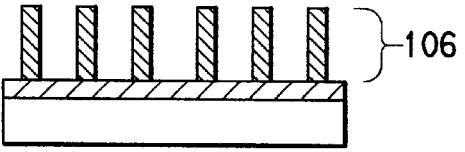
Figure 4:
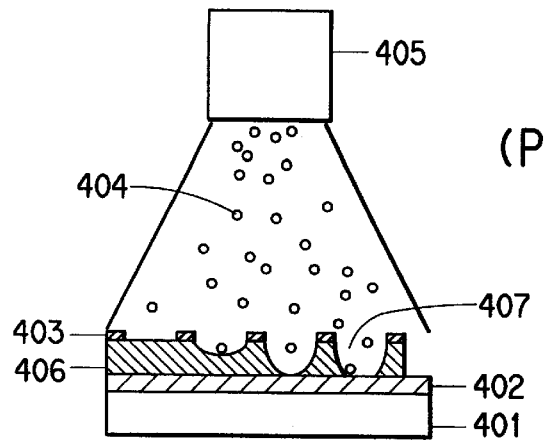
FIG. 4 is a schematic representing a sandblasting barrier-rib formation method.
Figure 5:
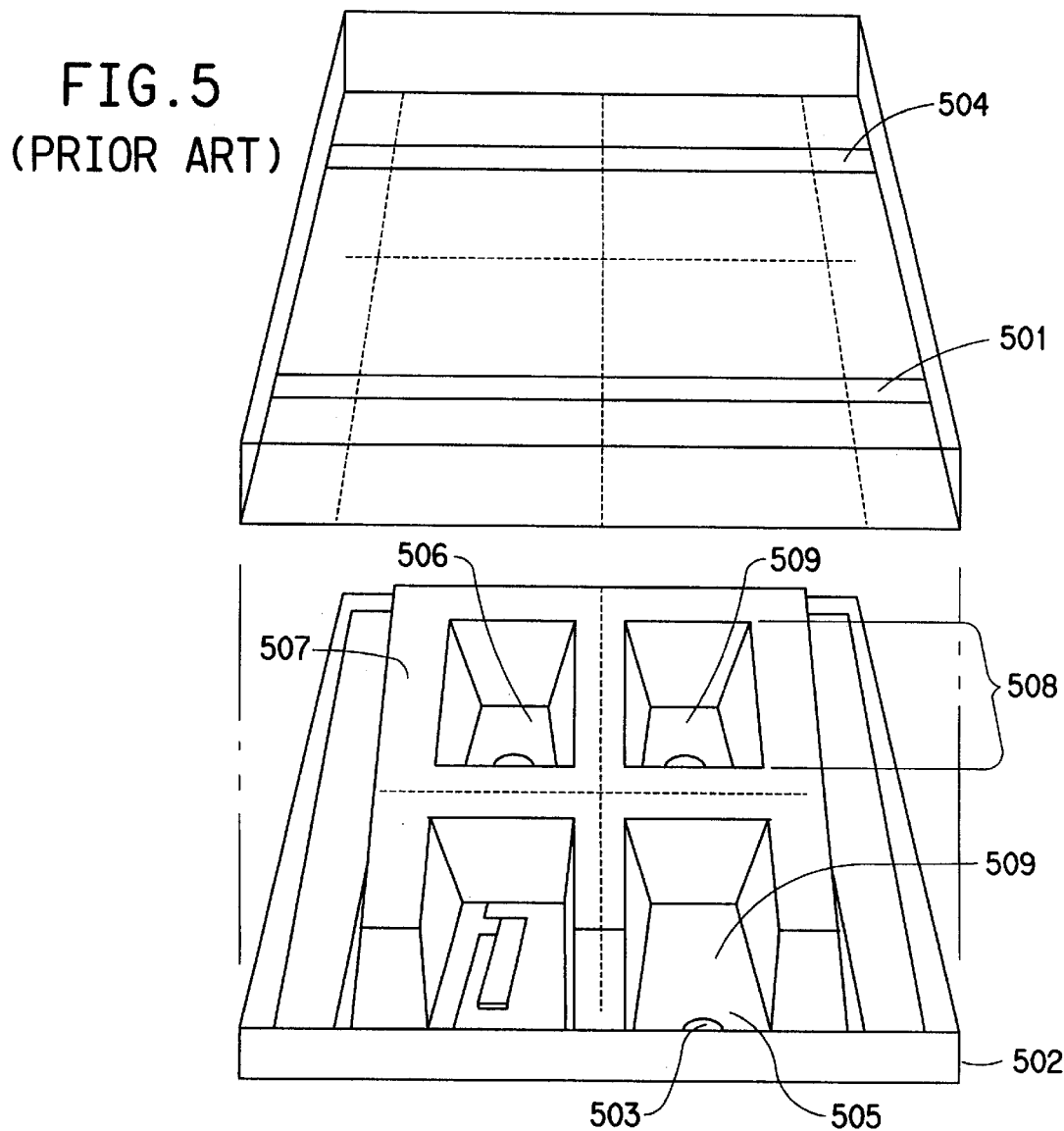
FIG. 5 is a schematic of the internal structures of a DC PDP apparatus.

The present invention is presented in detail while referring to FIGS. 1 through 3, which illustrate a case in which a cathode or anode is formed on one of the pair of glass substrates, i.e., the front and back panels, that make up the PDP apparatus, and a barrier-rib is formed on the glass substrate on which the anode has been formed (hereinafter referred to as "back panel"). The following refers to FIG. 3.

(301): A terminal electrode used for external input is formed on the glass substrate.

(302): An anode bus is formed on the same substrate.

(303): A direct current control resistor group that is electrically connected with the anode bus formed in the previous step is formed on the same substrate (when a substrate with no resistance is used, this step is omitted).

(304): An insulator layer that electrically insulates the bus from the discharge space is formed on the anode formed in (302).

(305): An anode pad is formed at the opening in the insulator layer (304); the anode pad remains exposed to form a pair with the cathode (307) responsible for the voltage discharge.

(306): A barrier-rib that defines a discharge region (image cell) is formed using an insulator composition corresponding to the position of the resistor and anode formed up to the previous step. This barrier-rib formation step comprises the following steps (see FIG. 1).

1a—An anode (101) is formed on a glass substrate (102).

1b—The green tape (103) of the present invention is laminated (the number of layers is selected from a range of one to three wherein the desirable green tape layer(s) is within the range of 100 to 300 μm) over the lower structure formed on the glass substrate. The structure is then heated within a range of 300° C. to 400° C. to remove a controllable (e.g., 60 to 80 weight %) amount of organic material. The green tape layer is referred to as the insulator layer. Depending upon the specification of resultant barrier-rib structure, the bottom layer(s) may have different insulator compositions from the top layer. For example, the bottom layer may contain alumina as the only refractory oxide and the top layer may contain alumina and cobalt iron oxide to produce a black color at the top of the barrier-rib.

1c—A photoimageable sandblasting resist (104) is applied to the uppermost portion of the insulator layer.

1d—A resist pattern (105) is formed corresponding to the region in which the insulator layer is to be left behind by sandblast etching.

1e—An abrasive material and air are sprayed simultaneously from the nozzle(s) of a sandblasting machine from above the sandblasting resist layer, the abrasive material collides with and cuts into the insulator layer in the region where no resist layer has been formed and a barrier-rib is left behind after sandblasting defines the image cell of a PDP apparatus.

1f—The sandblasting resist layer is stripped away.

1g—The barrier-rib thus formed is fired (106). While keeping steps 1a, 1c–1g the same, an alternative step (1h) may be used to substitute 1b in the formation of the barrier rib.

1h—The green tape (103) of the present invention is laminated (the number of layers is selected from a range of one to three wherein the desirable green tape layer(s) is within the range of 100 to 300 μm) over the lower structure formed on the glass substrate. The structure on which an insulator layer has been formed is heated to between 350° C. to 450° C. to remove all of the organic substance and soften or melt glass I and/or part of glass II. The green tape layer is referred to as the insulator layer. Depending upon the specification of resultant barrier-rib structure, the bottom layer(s) may have different insulator compositions from the top layer. For example, the bottom layer may contain alumina as the only refractory oxide and the top layer may contain alumina and cobalt iron oxide to produce a black color at the top of the barrier-rib.

Any common firing furnace used in the field of ordinary thick film hybrid ICs can be used for the firing. Typical firing conditions involve keeping the structure at a temperature of about 400 to 650° C. for approximately 5 to 20 minutes under suitable air flow and exhaust conditions. There is a close correlation between the firing temperature conditions and the thermal characteristics of the amorphous glass and refractory oxide in the insulator composition of the green tape, and the firing conditions should be modified according to the material being used in order to obtain good barrier-rib performance. Depending on the firing conditions, part of the amorphous glass in the insulator composition may crystallize as well.

The temperature elevation rate until the peak temperature is reached should be about 10 to 50° C. per minute, but near the pyrolysis temperature of the organic component present in the green tape, the temperature elevation rate should be sharply decreased to avoid abrupt firing, after which the temperature should again be raised at a rate that takes into account productivity, sinterability, etc. This allows the incineration of the organic matter in the green tape to be accomplished smoothly and more completely.

Returning to FIG. 3 (306): The back panel constructed in the steps as shown in FIG. 1 is superposed at a specific position on a front panel on which a cathode has been formed (307), thereby assembling a pair a glass substrates (309) in which a phosphor layer (308) to generate green, blue or red color is deposited on the inner surface of the image cells.

(310): The edges of the assembly in which a pair of glass substrates are arranged opposite to each other are sealed using a low melting point glass composition, for example, and fired at a low temperature.

(311): A discharge gas is charged into the cell that was sealed airtight creating a gas discharge section.

A PDP apparatus-cell can be manufactured by following the above.

In the above-mentioned first method for forming a barrier-rib for a PDP apparatus (see FIGS. 1 & 3), a sandblasting resist is applied to the uppermost portion of a laminate of a green tape, but instead of using this resist, a sandblasting resist (204) is used that contains a photopolymer, monomer, and a photopolymerization initiator, and contains a relatively large amount of resin component which provides resistance to sandblasting but it also contains a high amount of glass and/or ceramic particles which will sinter during firing. Therefore, this resist does not have to be stripped (see FIG. 2). Depending on the color requirement at the top layer of the resultant barrier-rib structure, this insulator layer may or may not contain refractory pigment such as the black pigment. The other steps are the same as in the above-mentioned barrier-rib formation method. Because there is no need to strip off the sandblasting mask pattern, the current method is simpler than the method of FIG. 1 so process and mass production efficiency are enhanced.

With the method of the present invention for forming a barrier-rib for a PDP apparatus, the use of the green tape which originates in the insulator composition of the present invention, not only results in thickness uniformity of the barrier-rib, but also simplifies the process and shortens the work time, and particularly improves the efficiency and process management of the sandblasting step. Therefore, the use of the insulator composition or green tape of the present invention, or of the barrier-rib formation method of the present invention, makes it possible to increase throughout in mass production and further increasing the size of the PDP apparatus at fine pitch.

Up to this point the description has focused solely on the formation of the plasma display apparatus barrier-rib of the present invention, but the makeup of the insulator composition can be varied and also used in the formation of an overcoat for the insulator layer of a plasma display apparatus.

EXAMPLES

The present invention will be described in further detail by giving practical examples. The scope of the present invention, however, is not limited in any way by these practical examples.

EXAMPLES 1–3

1) Preparation of Insulator Composition

Insulator compositions were prepared by ball milling the fine inorganic powders and binders, in a volatile organic solvent with the compositions shown in TABLE 1.

To optimize lamination, patternability, burnout properties, and fired structure integrity, the following volume relationship have been found to be advantageous. They will be converted into weight percentages to illustrate typical compositions. The inorganic phase will be assumed to have a specific gravity of 4.5 and the vehicle will be assumed to have a specific density of 1.1.

|  | Weight % | Volume % |
|---|---|---|
| Inorganic phase | 55% typical; 45–65% practical | 23% typical; 17–31% practical |
| Organic phase (vehicle) | 45% typical; 55–35% practical | 77% typical; 83–69% practical |

Since the tape is usually coated from slip (see examples), the recipe for the slip must include solvent sufficient to lower the viscosity of the coatable slip to under 10,000 centipoise; typical viscosity ranges are 2,000 to 7,000 centipoise. A typical slip has two to four weeks storage stability before coating. Due to the high viscosity of the coated tape, they are usually stable once coated.

TABLE 1

| Component | Ex. 1 | Ex. 2 | Ex. 3 |
|---|---|---|---|
| glass frit | 33 wt % | 30 wt % | 24.3 wt % |
| (vol % glass frit in tape) | 56 vol % | 50 vol % | 39 vol % |
| alumina | 21 wt % | 24 wt % | 29.7 wt % |
| (vol % alumina in tape) | 44 vol % | 50 vol % | 61 vol % |
| polyacrylate | 11 wt % | 11 wt % | 11 wt % |
| dibutyl phthalate | 11 wt % | 11 wt % | 11 wt % |
| acetone/ethyl acetate mixed solvent | 24 wt % | 24 wt % | 24 wt % |

The glass frit in the above table had the following compositions in weight %.

| ZnO | 8.0% |
|---|---|
| $SiO_2$ | 15.0% |

-continued

| PbO | 65.0% |
|---|---|
| $B_2O_3$ | 12.0% |

The fine inorganic powders having the following specific surface areas were used as the inorganic micropowders.

| glass frit | 3.5 $m^2/g$ |
|---|---|
| alumina | 1.2 $m^2/g$ |

Preparation of Green Tape

An insulator composition prepared as set forth in section 1) above was coated over a polyester film with a thickness of 3 mil that had undergone a silicon treatment (trade name: Mylar, made by E. I. du Pont de Nemours and Co.) such that the thickness of the composition when wet was approximately 15 mil, and this product was then dried at room temperature to evaporate 80 to 90 wt % of the organic solvent, which yielded a green tape with a thickness of 120 $\mu$m.

Formation of Barrier-Rib

Using the green tape prepared above and the method described in FIG. 1 or 2, specifically a 380° C. to 470° C. heat treatment, about 80 weight % of the remaining organic phase (i.e. polymer binders and plasticizers) were removed and a barrier rib was formed on a glass substrate after sand blasting.

The above green tape laminate was subjected to a pencil scratch test according to JIS K 5400-1979 (JIS general paint testing method), and the results together with the dimensions of the sandblasted barrier-rib before and after firing, are given below.

TABLE 2

|  | Ex. 1 | Ex. 2 | Ex. 3 |
|---|---|---|---|
| Pencil scratch test | 9H | 9H | 9H |
| Barrier-rib dimension before firing |  |  |  |
| Height ($\mu$m) | 220 | 230 | 220 |
| Width ($\mu$m) | 100 | 100 | 100 |
| Barrier-rib dimension after firing |  |  |  |
| Height ($\mu$m) | 130 | 165 | 185 |
| Width ($\mu$m) | 85 | 80 | 83 |
| Barrier-rib dimension variance (stand. dev.) ($\mu$m) | 12 | 7 | 5 |

In the table, the values for the barrier-rib dimension are averages of values obtained by selecting and measuring 20 points at random in the barrier-rib formed by the first and second methods.

EXAMPLES 4–6

1) Preparation of Insulator Composition

Insulator compositions were prepared by ball milling the fine inorganic powders and binders in a volatile organic solvent with the compositions shown in the following table.

TABLE 3

| Components | Example 4 | Example 5 | Example 6 |
|---|---|---|---|
| a-1) glass frit I | 4 wt % | 6 wt % | 8 wt % |
| a-2) glass frit II | 30 wt % | 28 wt % | 26 wt % |
| a-3) alumina | 20 wt % | 20 wt % | 20 wt % |
| b-1) polyacrylate | 8 wt % | 8 wt % | 8 wt % |

TABLE 3-continued

| Components | Example 4 | Example 5 | Example 6 |
| --- | --- | --- | --- |
| b-2) dibuty phthalate and butyl benzyl phthalate | 10 wt % | 10 wt % | 10 wt % |
| c-1) methyl ethyl ketone/ethyl acetate | 28 wt % | 28 wt % | 28 wt % |

The glass frit I in the above table and Examples 7, 8 and 9 had the following weight percent compositions.

| | |
| --- | --- |
| $PbF_2$ | 5.0% |
| $SiO_2$ | 1.0% |
| PbO | 83.0% |
| $B_2O_3$ | 11.0% |

The glass frit II in the above table and Examples 7, 8 and 9 had the following weight percent compositions.

| | |
| --- | --- |
| ZnO | 8.0% |
| $SiO_2$ | 15.0% |
| PbO | 65.0% |
| $B_2O_3$ | 12.0% |

2) Preparation of Green Tape

An insulator composition prepared as set forth in section 1) above was coated over a polyester film with a thickness of 3 mils that had undergone a silicon treatment (trade name: Mylar, made by E. I. du Pont de Nemours and Company) such that the thickness of the composition when wet was 12.5 mils, and this product was then dried at 85° C. to 90° C. for 10 to 20 minutes to evaporate 95 to 99.5 wt % of the volatile organic solvents, which yielded a green tape thickness of 90 microns. A plain polyester film with a thickness of 1 mil (trade name Mylar, made by E. I. du Pont de Nemours and Company) was laminated to the coated green tape before its being wound up for slitting to any desirable width and length.

Formation of Barrier-Rib

Using the green tape prepared above and the method described in FIG. 1 or 2, specifically a 380° C. to 470° C. heat treatment, nearly all of the organic phase (i.e., polymer binders and plasticizers) were removed and a barrier-rib was formed on a glass substrate after sand blasting.

TABLE 4

| Components | Example 4 | Example 5 | Example 6 |
| --- | --- | --- | --- |
| Pencil scratch test | 9H | 9H | 9H |
| Barrier-rib dimension before firing | | | |
| Height (μm) | 215 | 215 | 215 |
| Width (μm) | 100 | 100 | 100 |
| Barrier-rib dimension after firing | | | |
| Height (μm) | 168 | 172 | 177 |
| Width (μm) | 90 | 90 | 92 |
| Barrier-rib dimension variance (μm) | 12 | 7 | 5 |

In the table, the values for the barrier-rib dimension are averages of values obtained by selecting and measuring 20 points at random in the barrier-rib formed by the first and second methods.

EXAMPLES 7–9

1) Preparation of Insulator Composition

Pigmented insulator compositions were prepared by ball milling the fine inorganic powders and binders in a volatile organic solvent with the compositions shown in the following table.

TABLE 5

| Components | Example 7 | Example 8 | Example 9 |
| --- | --- | --- | --- |
| a-1) glass frit I | 4 wt % | 4 wt % | 4 wt % |
| a-2) glass frit II | 30 wt % | 28 wt % | 26 wt % |
| a-3) alumina | 6 wt % | 12 wt % | 14 wt % |
| a-4) cobalt chromium iron oxide | 14 wt % | 12 wt % | 10 wt % |
| b-1) polyacrylate | 8 wt % | 8 wt % | 8 wt % |
| b-2) dibutyl phthalate and butyl benzyl phthalate | 10 wt % | 10 wt % | 10 wt % |
| c-1) methyl ethyl ketone/ethyl acetate mixture | 28 wt % | 28 wt % | 28 wt % |

2) Preparation of Green Tape

An insulator composition prepared as set forth in section 1) above was coated over a polyester film with a thickness of 3 mils that had undergone a silicon treatment (trade name: Mylar, made by E. I. du Pont de Nemours and Company) such that the thickness of the composition when wet was 5.5. mils, and this product was then dried at 85° C. to 90° C. for 10 to 20 minutes to evaporate 95–99.5 wt % of the volatile organic solvents, which yielded a green tape thickness of 40 microns. A plain polyester film with a thickness of 1 mil (trade name Mylar, made by E. I. du Pont de Nemours and Company) was laminated to the coated green tape before its being wound up for slitting to any desirable width and length.

3) Formation of Barrier-Rib

Using the pigmented (black) green tape prepared above, and the green tape prepared in Example 4 (white), a barrier-rib was formed on a glass substrate according to the first and second barrier-rib formation methods for a PDP apparatus described in FIGS. 1 and 2.

The pigmented green tape has enhanced color contrast and prevented the reflection of external light for individual color cells.

We claim:

1. A green tape used in the formation of a barrier-rib for a plasma display apparatus whereby the green tape upon firing forms an amorphous, non-crystallizable glass and wherein the green tape composition consists essentially of
   (a) an inorganic powder comprising based on total volume of the inorganic powder
     (i) 30 to 60 vol % of an amorphous, non-crystallizable glass,
     (ii) 20 to 70 vol % of a refractory oxide, and
     (iii) 0–50 vol % refractory pigment;
     wherein the glass has a softening point at least 50° C. lower than a firing temperature range of 400° C.–650° C.
     wherein the glass has a viscosity of $1 \times 10^5$ poise or less at a firing temperature range of 400°C.–650° C. for the green tape composition;
   (b) a binder of 40 to 60 vol % polymer and 40 to 60 vol % plasticizer; and
   wherein the green tape composition is coated over a flexible substrate.

2. A green tape used in the formation of a barrier-rib for a plasma display apparatus whereby the green tape upon firing forms a first amorphous, non-crystallizable glass and a second amorphous, non-crystalline glass wherein the green tape composition consists essentially of (a) an inorganic powder comprising based on total volume of the inorganic powder
  (i) 1 to 30 vol % of an amorphous, non-crystallizable first glass,
  (ii) 30 to 60 vol % of an amorphous, non-crystallizable second glass,
  (iii) 20 to 70 vol % of a refractory oxide, and
  (iv) 0–50 vol % refractory pigment
  wherein the second glass has a softening point at least 50° C. lower than a firing temperature range of 400° C.–650° C.; and
  wherein the first glass has a softening point at least 50° C. lower than the softening point of the second glass;
  wherein the first and second glasses have a viscosity of $1 \times 10^5$ poise or less at a firing temperature range of 400° C.–650° C. for the green tape composition;

(b) a binder of 40 to 60 vol % polymer and 40 to 60 vol % plasticizer; and wherein the green tape composition is coated over a flexible substrate.

3. The green tape of claim 1 or 2 wherein an additional flexible substrate is laminated on the green tape.

4. A composite green tape composed of a top layer and a bottom layer wherein the top layer comprises the tape composition of claims 1 or 2, and the bottom layer comprises the tape composition of claims 1 or 2 with the proviso that the bottom layer differs compositionally from the top layer.

* * * * *